United States Patent
Persson et al.

(10) Patent No.: US 6,237,278 B1
(45) Date of Patent: May 29, 2001

(54) METHOD AND DEVICE FOR WEED CONTROL

(75) Inventors: Bertil Persson; Pär Henriksson, both of Lund; Tomas Nybrant, Storveta; Berit Mattsson, Kävlinge, all of (SE)

(73) Assignee: Zero Weed AB (SE)

( * ) Notice: Subject to any disclaimer, the term of this patent is extended or adjusted under 35 U.S.C. 154(b) by 0 days.

(21) Appl. No.: 09/242,387

(22) PCT Filed: Aug. 16, 1996

(86) PCT No.: PCT/SE96/01068

§ 371 Date: Apr. 16, 1999

§ 102(e) Date: Apr. 16, 1999

(87) PCT Pub. No.: WO98/07314

PCT Pub. Date: Feb. 26, 1998

(51) Int. Cl.[7] .................................................. A01M 21/04
(52) U.S. Cl. .............................................................. 047/1.3
(58) Field of Search ............................. 47/1.3, 58.1, 1.5, 47/1.7; 111/118, 200, 915; 43/112; 405/131

(56) References Cited

U.S. PATENT DOCUMENTS

| | | |
|---|---|---|
| 492,635 | 2/1893 | Sharp ..................................... 47/1.3 |
| 546,682 | 9/1895 | Scheible . |
| 1,661,030 | 2/1928 | Burt ....................................... 47/1.3 |
| 2,007,383 | 7/1935 | Opp ........................................... 47/1 |
| 2,429,412 | 10/1947 | Keller . |
| 2,588,561 * | 3/1952 | Opp et al. .............................. 47/1.3 |
| 2,591,597 | 4/1952 | Opp et al. . |
| 2,607,165 | 8/1952 | Rainey ................................... 47/1.3 |
| 2,632,285 | 3/1953 | McCreight et al. ..................... 47/1.3 |
| 2,682,729 * | 7/1954 | Poyner ................................... 47/1.3 |
| 2,754,622 * | 7/1956 | Rohnert .................................. 47/1.3 |
| 3,307,289 * | 3/1967 | Lemm .................................... 47/1.3 |
| 3,559,337 | 2/1971 | Marcoux et al. ....................... 47/1.3 |
| 3,919,806 | 11/1975 | Pluenneke et al. ..................... 47/1.3 |
| 4,007,794 | 2/1977 | Pluenneke et al. ........................ 47/1 |
| 4,047,326 * | 9/1977 | Tibbs ..................................... 47/1.3 |
| 4,092,800 | 6/1978 | Wayland, Jr. et al. ................. 47/1.3 |
| 4,094,095 | 6/1978 | Dykes .................................... 47/1.3 |
| 4,257,190 * | 3/1981 | Dykes .................................... 47/1.3 |
| 4,338,743 | 7/1982 | Gilmore ................................. 47/1.3 |
| 4,338,744 * | 7/1982 | Gilmore ................................. 47/1.3 |
| 4,428,150 * | 1/1984 | Geierbach et al. .................... 47/1.3 |
| 4,758,318 * | 7/1988 | Yoshida ................................. 47/1.3 |
| 4,817,331 * | 4/1989 | Podsiadley et al. ................... 47/1.3 |
| 5,117,579 * | 6/1992 | Tellefson .............................. 47/1.3 |

FOREIGN PATENT DOCUMENTS

| | | |
|---|---|---|
| 2328705 | 1/1975 | (DE) . |
| 2497633 | 1/1981 | (FR) . |
| 2487168 * | 1/1982 | (FR) . |
| 2492631 * | 4/1982 | (FR) . |
| 8404656 | 12/1984 | (WO) . |

OTHER PUBLICATIONS

Derwent's abstract, No. 94–315222/39, week 9439, Abstract of SU, 1817955; Bryan Agric Inst,; May 30 1993; 1 page.

Wayland et al, Control of weeds with UHF electromagnetic fields, Weed Research, vol. 15, pp. 1–5, 1975.

Diprose et al, "The Effect of Externally Applied Electrostatic Fields,. . . ", The Botanical Review, vol. 50, No. 2, pps 171–221, 1984.

* cited by examiner

Primary Examiner—Peter M. Poon
Assistant Examiner—Jeffrey Gellner
(74) Attorney, Agent, or Firm—Hayes, Soloway, Hennessey, Grossman & Hage, PC

(57) ABSTRACT

Weed seeds are controlled by high voltage pulses with short duration which electropermeabilize the cell membranes of weed seeds in the ground. The device is selective and damages only germinating weed seeds and plants early in their life cycle. The required amount of energy is small; with rectangular pulses the optimal field strength is between 100–300 kV/m with a duration of (10–100 microseconds). A transformer placed on a sowing machine transforms electrical energy to high voltage pulses. The energy may be taken from the pulling tractor via a transmission or from an integrated power source. The high voltage pulses are applied to electrically conducting via applicators to two or more fixedly spaced plates to the soil around newly sown seeds.

38 Claims, 4 Drawing Sheets

METHOD AND DEVICE FOR WEED CONTROL

BACKGROUND OF THE INVENTION

This invention concerns a method and a device for weed control by means of electricity.

For many years the use of weed poisons, in addition to purely mechanical methods, has been the dominating method for weed control. There is increasing concern that an extensive use of weed poisons may harm the environment as well as humans and animals. This concern has led to an increasing interest for alternative non-chemical methods as a complement to the traditional mechanical methods.

The concept of killing weed by means of electric energy has been used since the 1890's when "Vegetation exterminators" was patented (Sharp, A. A. 1893, Scheible, A. 1895) The technique was also developed also for weed control in the agriculture (Buret, W. E. 1928, Opp, F. W. ; Collins, W. C. 1935, Opp, F. W. 1952, Poynor, R. R. 1954). It has been further suggested for use in farming, in particular non-specific superficial treatment of the soil by moving electrodes along the ground surface and applying an alternating voltage (Laronze 1982) or constant high voltage (Krause 1975).

Equipment using electric current for pruning of blueberry bushes and dehydration of the foliage of root crops before harvest has been suggested by (Plueneke, R. H. ;Dykes, W. G. 1975, Plueneke, R. H. ;Dykes, W. G. 1977).

Thinning out of drilled plants was suggested in the 1950's by (Rainey, E. C. 1952, McCreight, N. L. 1953). Use in soil sterilizing and fertilizing has also been suggested (Keller, C. R. 1947, Opp, F. W.; Collins, W. C. 1935). Wayland et al (1975) showed that technically one can use micro waves for sterilizing soil before sowing. Weed and weed seed a few cm into the ground can be killed with microwaves having a frequency of 2450 MHz and the power 60 kW. The machine used was a 150 kW diesel driven generator that fed a microwave generator and a hydraulic system that slowly moved the equipment forward. Dipose et al. (1984) estimated that it would take between 100–1000 hours per feature to treat some types of weeds. Such long times are unavoidable. The machine radiates microwaves down into the ground to heat everything and must literally boil the weed which requires a great deal of energy. A further drawback is that also the micro flora in the soil is knocked out.

As is apparent from the above it has not yet turned out to be practical to use electricity for weed control. It is quite simply too expensive and time consuming in relation to chemical and mechanical control methods.

THE SUMMARY OF THE INVENTION

Despite the above problems the object of the invention is to provide a method for weed control based on the use of electricity. Surprisingly enough, in view of the known technique, weed control with electricity can in accordance with the invention be carried out with a very reasonable energy consumption by using short high voltage pulses with low energy content but sufficiently high for electropermeabilitation of cell membranes in growing weeds. The invention can be used for weed control in farming, horticulture gardening, forestry, parks or other suitable areas and particularly connection with sowing. The invention only damages growing seeds and plants early in their life cycle and makes it impossible for them to germinate or survive on. Dry seeds for sowing are not affected which is why the invention can be used with advantage in connection with sowing without influencing seed germination. Neither is the micro flora in the soil affected within the specified voltage span. When seeds start to grow they are very sensitive to electricity. However, when the seed has grown into a plant a considerable amount of electrical energy is necessary to harm the plant to the extent that it does not continue to grow on. In order harm ungrown seeds with electric voltage pulses or electric current, considerable amounts of electric energy is required, one must practically boil the seed.

The problem is that when the intended crop is sown, the seeds of the weeds are already in the ground and have already started to germinate. According to known techniques, one is therefore obligated to fight the weeds in order to let the intended crop come into its own. By treating the ground that is to be sown in accordance with the invention with electrical pulses with low energy, weeds that have just started to germinate can be stopped in their development. By undertaking this control simultaneously with sowing, the intended crop is given an improved chance of having time to grow before the weeds grow. Thus, by employing the use of electricity in accordance with the present invention in connection with planting and preferably simultaneously with sowing, it is possible to eliminate germinating weed seeds. Weed seeds growing later have less chance of asserting themselves since they have competition from the growing crop. Furthermore, since sowing typically has been preceded by mechanical working of the ground, pre-existing weeds already would have been eliminated. By feeding short high voltage pulses to the ground the sprouting weed can be controlled. The high voltage pulses of short duration will not cause any great damages to the weed sprouts as such. However, the amount of energy is sufficient to achieve an electropermeabilizing of the cell membranes of the sprouting weed seeds. This in turn leads to stopping growth for the damaged sprouts. Since the seeds of the intended ground crop has yet started to germinate at sowing they are not affected and sowing and weed control can be executed with the same machine without any inconvenience, on the contrary it is particularly practical to execute weed control and sowing simultaneously so that the intended crop gets the competing weed sprouts eliminated at the optimally correct time. The amount of energy that is required for the control described here is insignificant and is apparent from the following formula 1.

Formula 1

Mean power=(conductivity in the ground)×(the field strength)$^2$×(degree of modulation)/(Density) (W/kg)

Conductivity=0.2 siemens

Field strength=300 000 volt/m degree of modulation=1/10 000 density 1500 kg/m$^3$

The momentary power in the pulse is very high, for instance 12 MW/kg but since the pulse is of very short duration (typically 100 microseconds long) and is applied once a second the mean power is considerably lower, that is 12 kW/kg. In practice a capacitor battery charged that is discharged very quickly and deliver the desired high voltage pulse. Alternatively, alternating voltage is used that can be transformed to high voltage.

The treatment of plant cells with these high voltage pulses primarily influences protoplasm dependent on the barrier that is constituted by the cell wall. With rectangular pulses the optimal amplitude of the field strength is between 100–300 kV/m with a duration of (10–100 micro seconds).

With exponentially declining pulses the field strength is weaker (25–75 kV/m) and the duration of the pulse longer (1000–20 000 microseconds).

There are examples of experiments with intact plant cells of for instance rice that shows that the cell wall is not an absolute obstacle to electroporation (Morikawa et al 1986; Dekeyser et al.,1990). The invention is based on one using an electric field strength high enough so that the cell membranes are destroyed or punctured and the cell dies as a result of this. The earth bed is treated with pulses of short duration (0,1–1 millisseconds) with the field strength 150–300 kV/m (1500 3000 V/cm). These high field pulses have has a selective destructive effect on germinating weed seeds while dry seeds for sowing are not influenced. In order to effect the bacterial flora in the ground, higher field strengths and longer pulses are necessary. However, larger animals as maggots or noxious; insects may be affected.

This new technique has been evaluated with white mustard (Sinapsis alba, var. Emergo) simulating weed with high germination (87 %). The white mustard was cultivated in fertilized peat earth (70% earth, 30% Perlite) in plastic containers (5×11×16 cm) that were placed on a watering carpet in order to ensure an even earth humidity. The plants were cultivated in a climate chamber with a mean climate corresponding to 15th May in Skåne. The evaluation was executed in three main groups, I. dry seeds, II. germinated seeds and III seeds moistened in nutrition solution. In all tests pulses with a pulse length of 80 $\mu$S have been applied. At all tests check groups have been used where the treatment has been as like that of the treated groups as possible.

The dry seeds (group I) were placed in trays with nutrient solution, and pulses with a field strength of 500–7500 V/cm was applied. Groups of ca 5 seeds were treated and were then placed on moist growing substrate in petri bowls. The seeds germinated normally, that is the treatment had no effect.

The germinating seed (group II) were tested in cultivating trays, 15×25 cm, with ca three cm thick layer of soil. Groups of 6 seeds were sown and treated with 1000, 1500, 2000, 2500 and 3000 V/cm. One seed in every tray constituted control. The seeds were treated 2, 4, 6 and 8 days respectively after sowing, in each group totally 8 cultivating trays were included, where one tray was control. The results were evaluated by determining of the number of seeds not germinating by visual examination of and by weighing of the plants. Our evaluation showed that a treatment with field strengths above 2000 V/cm had a strong effect on seeds that were treated 2 and 4 days after sowing. If the plant was left 6 or 8 days a clear retardation could be observed but the plant lived on.

In order to establish if the moisture content of the seed was of decisive importance to the result, seeds were placed in nutrition solution for different times (group III). All were treated with 3000 V/cm. The tests showed that all the seeds that had been in a nutrition solution for at least 35 minutes lost there fertility entirely.

The method has no effect on dry seeds. Also plants that have reached a certain size can take the treatment without serious damages. The method may be very useful particularly in connection with sowing where the useful crop is not damaged but weeds that are in an early stage are totally knocked out. Already established weeds can be handled with mechanical methods.

BRIEF DESCRIPTION OF THE DRAWINGS

An embodiment of a device in accordance with the invention placed on a sowing machine pulled by a tractor is shown in FIG. 1.

DETAILED DESCRIPTION OF THE PREFERRED EMBODIMENT

Figure 1:
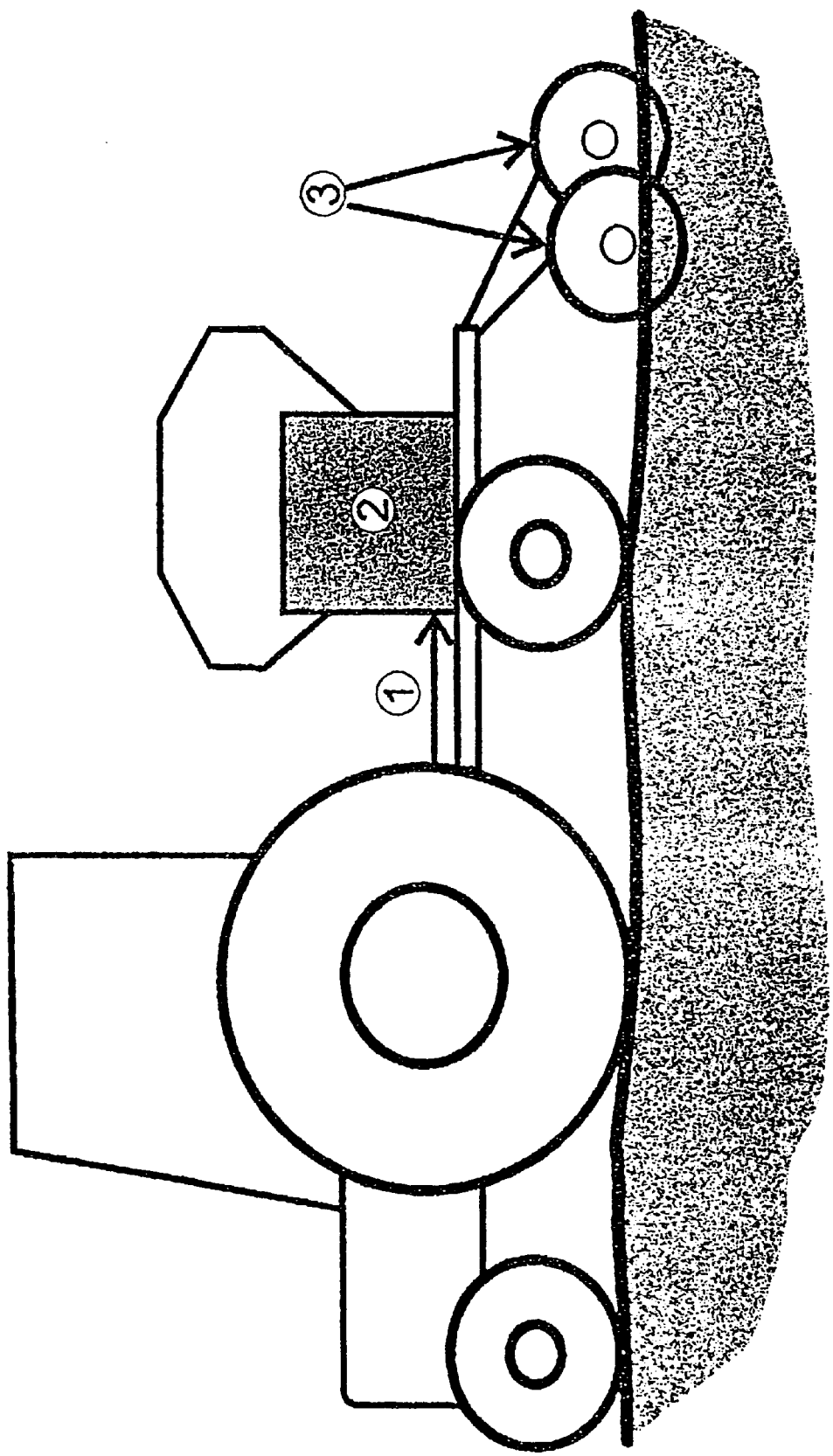

In accordance with FIG. 1 a transformer (2) is placed on a sowing machine, that is drawn by for instance a tractor. The transformer converts electrical or mechanical energy into high voltage pulses. The energy may be taken from the pulling tractor via a transmission (1) or from an integrated power source. The high voltage pulses are applied via applicators (3) placed on the sowing share down to the soil around the just sown seed.

Figure 2:
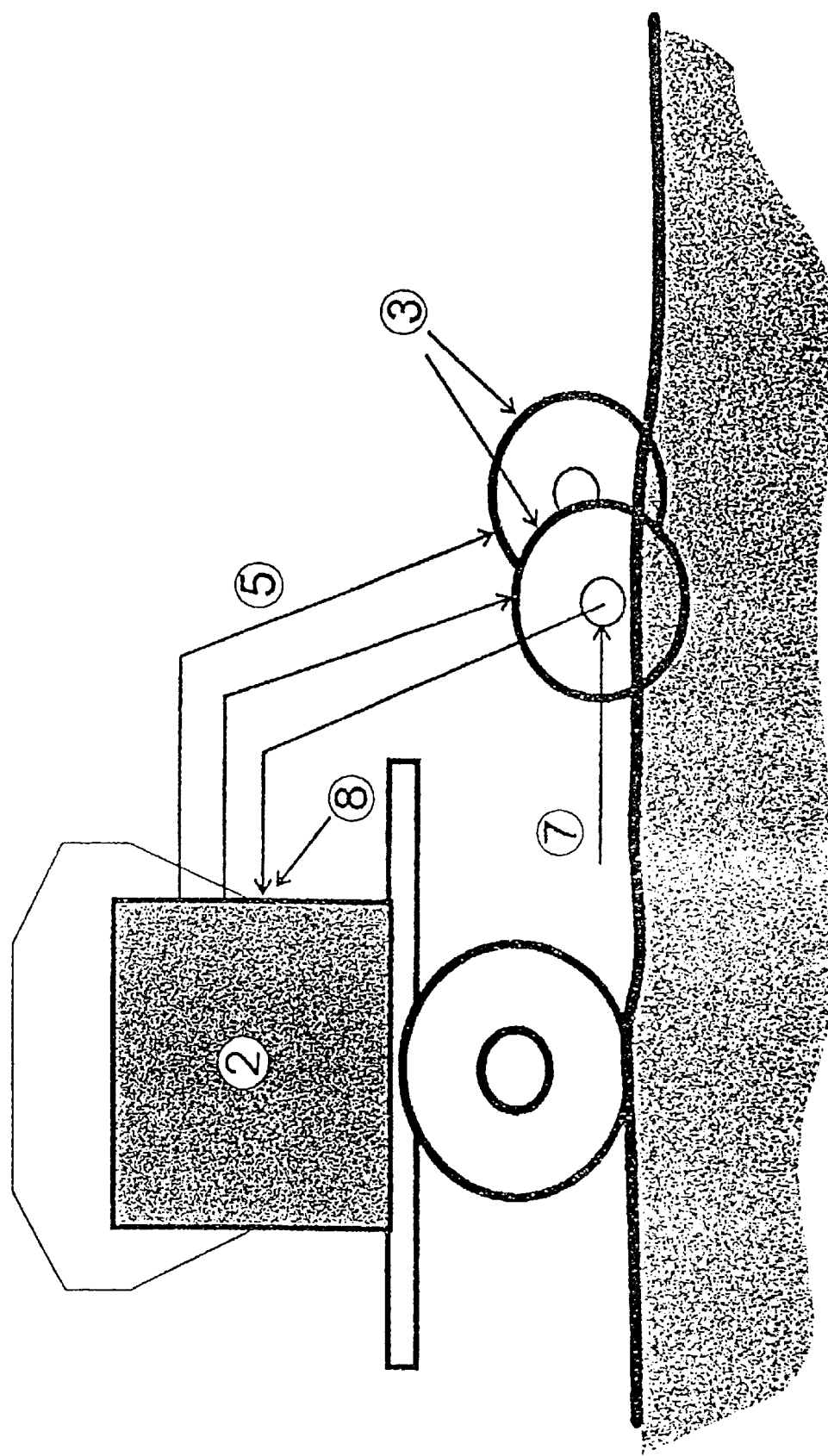
FIG. 2 shows the sowing machine with the invention in more detail.

In accordance with FIG. 2 the transformer (2) is coupled via a number, at least 2, high tension wires (5) to electrically conducting applicators (3), that have a given relative spacing and are in contact with the soil down to a depth of 4–15 centimeters, typically 5 centimeters. A sensor system (7) placed on the applicators provides the transformer with information of the conductivity of the soil and the speed with which these move through the soil. The signals are fed back to a signal transformer (8) placed in the generator system and are used to synchronize the pulse generator so that each part of the soil is treated with 5–25 pulses, typically 10. The pulses are to have a short duration, typically 0,01–1 millisecond and a field strength of 150–300 kV/m. At a distance between the applicators of 5 centimeters the voltage is typically to be 7500–15000V.

Figure 3:
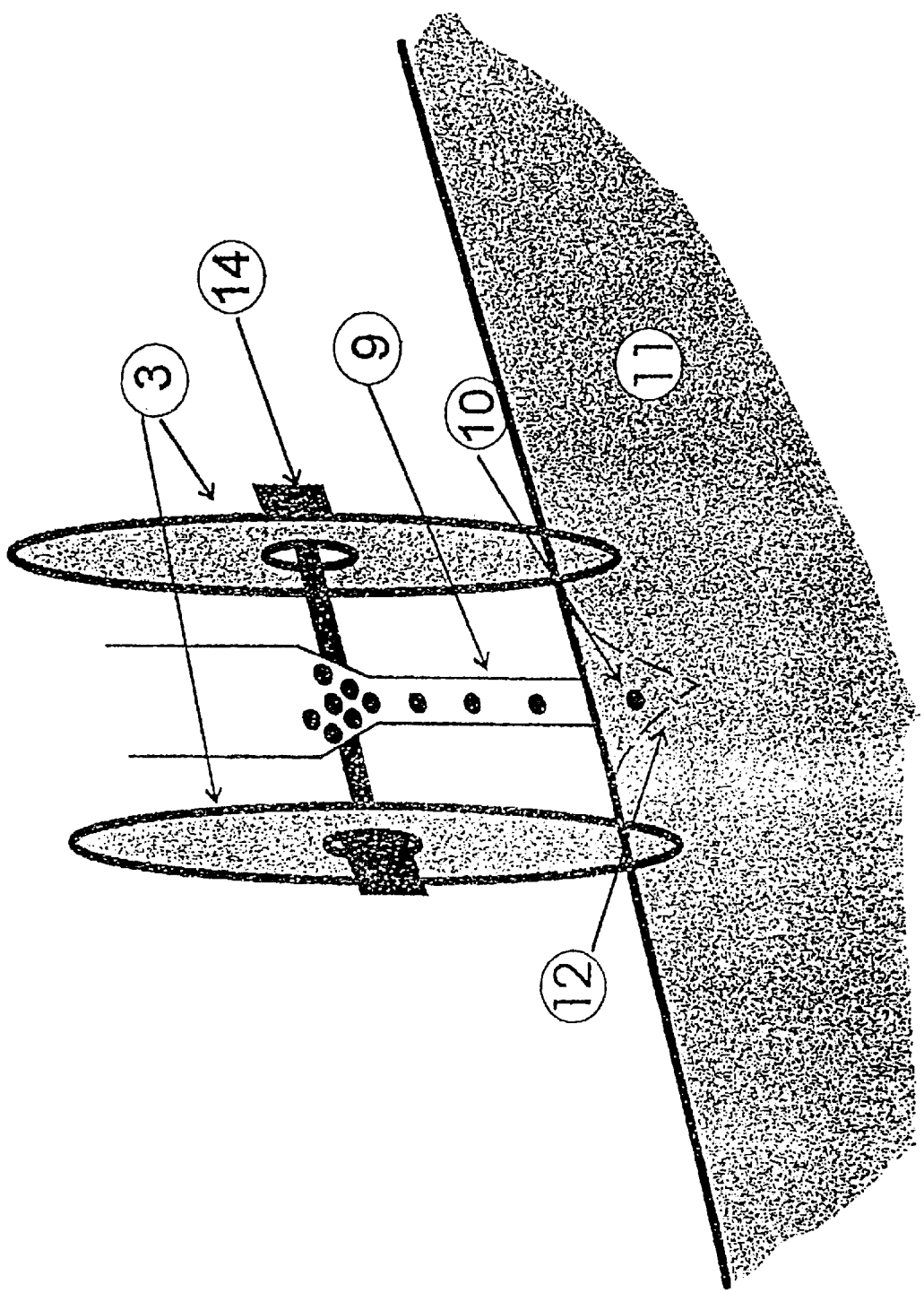
FIG. 3 shows a sowing share with applicators that introduce voltage pulses into the soil.

FIG. 3 shows the sowing share in more detail, the seed pass through a channel (9). The sown seed (10) gets into a groove (12) in the soil (11) between a pair of applicators (3). The applicators may be several in number and may be shaped as plates, rods or discs that are rigid or can rotate but these always have a constant relative spacing. On the applicators or in connection with these there are sensors (7) that register movement through the soil and the conductivity of the soil.

Figure 4:
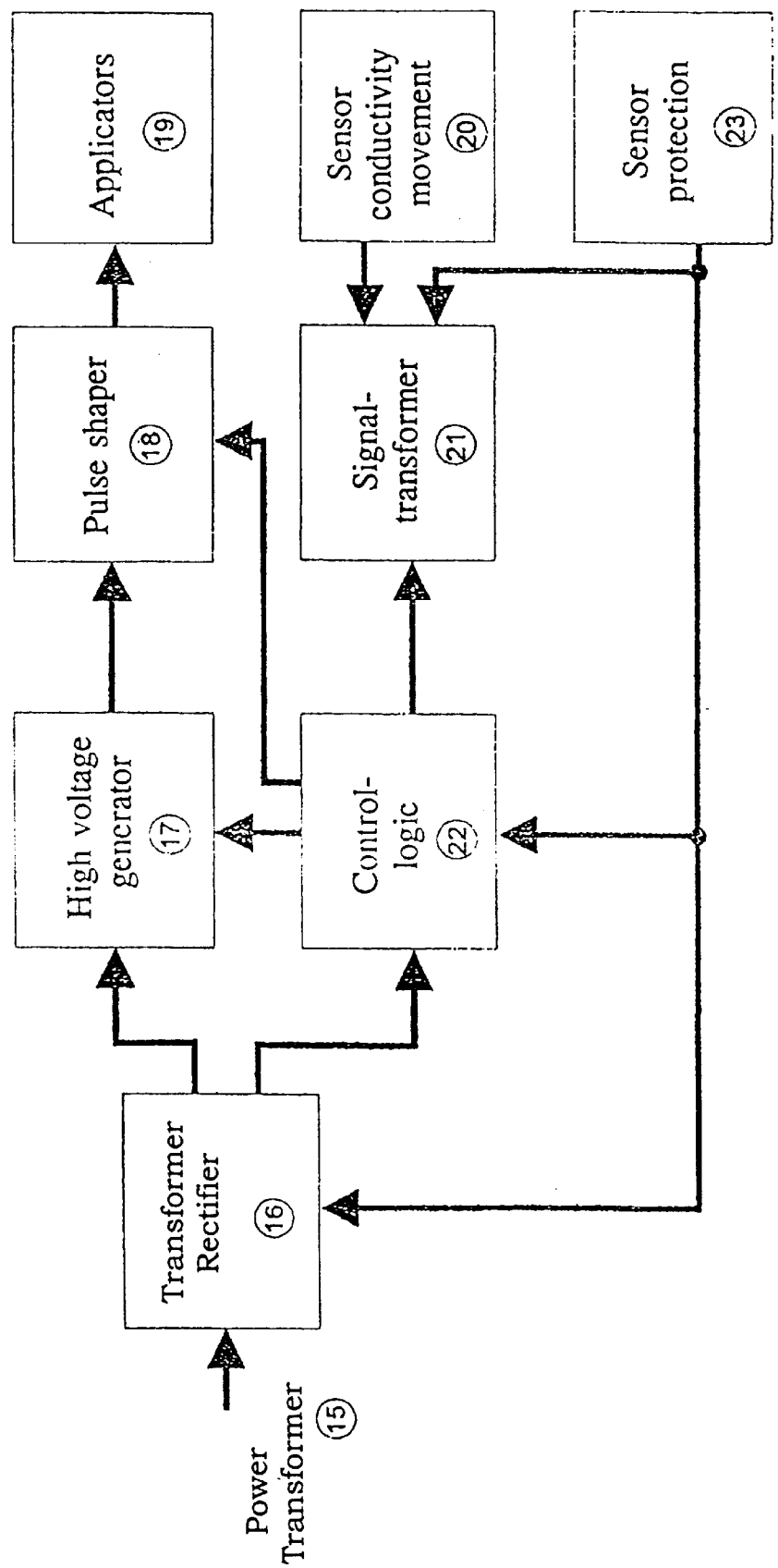
FIG. 4 is an example of how the pulse generator may be constructed.

In FIG. 4 is shown a block diagram of the pulse generator. The energy or power transformer (15) gets energy from the tractor or an integrated power source. The energy is transformed for instance by means of a transformer and rectifier (16) to a suitable level for instance 24 V DC. This rectified voltage provides current to a high voltage generator (17) for instance built as an oscillator and transformer. The high voltage may possibly be stored in a number of reservoir capacitors after rectifying. A pulse shaper (18) generates short pulses by opening and closing a valve element (tyristor, transistor or the like) with very short duration. The valve element can work directly with the high voltage or with a lower voltage that is transformed up in a last pulse transformer before it is applied in the soil with the applicators (19). The sensors (20) placed on the sowing share are coupled to signal transformers (21) giving suitable signals to a control logic (22) that controls the high voltage generator by controlling amplitude, frequency and/or pulse length. The control logic is also connected to the pulse shaper and controls the duration of the pulses and frequency and possibly pulse shape. Protections (23) may be used to protect users against electric casualties. If the user comes within the operating area of the device power trandnission, control logic and/or pulse shaper can be disconnected to prevent delivery of pulses.

In a further embodiment of the invention the control of weeds may be further effected by the adding of some suitable substance that effects the cells, for instance calcium ions, in connection with the electrical weed control. The added substance penetrates through the perforated cell membranes and work inside the cell restraining its growth or killing the cell. The amount of substance that has to be added is comparatively small and for instance, in the case of calcium ions no residual poisonous effect whatsoever, for the crop, rather the opposite. At the same time the efficiency in the electrical control is increased and lesser amounts of electricity are needed. Tests indicate that the required applied field strengths can be reduced to approximately ⅓. If the calcium ions are already present in sufficient amounts in the ground, no admixture has to be done. One can consider adding the substance in some form of solution, for instance $CaNo_3$, that is sprayed over the ground. Alternatively that the substance may be added together with the crop that is to be sown. If the substance used is constituted by a conventional pesticide the concentration of this can be reduced radically through elektroperforation since efficient influence may take place in the cells of the plant. The adding may take place simultaneously with or just before the electroperforation so that the substance can pierce through the cell membranes of the weed germs and work inside the cell. The substance can be a mineral salt or an organic combination, as a pesticide in low concentration. A concentration of calcium ions in the area 10–100 millimoles may be suitable. In order to achieve an exchange that is as good as possible from the used electric energy the electric pulses should have an exponentially rising front flank and an exponentially falling rear flank. The duration may be between 10 and 10 000 microseconds.

While the foregoing invention has been described as being used contemporaneously with sowing, it also may be used before sowing or even with connection with an earlier mechanical preparation of the ground.

The invention also may be used after sowing provided that it is adapted so that the intended crop is not damaged. For instance one can wait until this has grown sufficiently not to be harmed, alternatively one can at spaciously planted crops arrange applicators in pairs between rows of crop and feed these electrically so that the crop is not subjected to any pulses (the crop is surrounded by applicators with the same voltage).

What is claimed is:

1. Method for electrical weed control, which comprises feeding electrical high voltage pulses to the ground of an electric field sufficient to electropermeabilize growing cell membranes of weed seeds, wherein the electrical field strength is 100–300 kV/m and every pulse has a duration between 10–10,000 microseconds ($10^{-6}$ sec).

2. Method for electrical weed control, which comprises feeding electrical high voltage pulses to the ground of an electric field sufficient to electropermeabilize growing cell membranes of weed seeds wherein each section of ground being treated is subjected to 5 to 30 pulses.

3. Method for electrical weed control, which comprises feeding electrical high voltage pulses to the ground of an electric field sufficient to electropermeabilize growing cell membranes of weed seeds, wherein the pulses have an exponentially rising front pulse flank and an exponentially falling rear pulse flank.

4. Method for electrical weed control, which comprises feeding electrical high voltage pulses to the ground of an electric field sufficient to electropermeabilize growing cell membranes of weed seeds, and further including the step of feeding a cell poisonous substance to the ground whereby said electrical high voltage pulses drive said cell poisonous substance through said cell membranes of said weed seeds whereby to kill the cell.

5. A method according to claim 4, wherein said cell poisonous substance comprises calcium ions.

6. Method for electrical weed control, which comprises feeding electrical high voltage pulses to the ground of an electric field sufficient to electropermeabilize growing cell membranes of weed seeds, wherein the pulses are fed to the ground simultaneously with sowing of a crop.

7. Device for selective weed control comprising, in combination, applicators that are connected to a pulse generator and that receive electrical energy from an energy transformer, said applicators being arranged in pairs and being of an electrically conductive material, said applicators being arranged to contact the soil that is to be treated against germinating weeds, a device that registers (1) movement of the applicators in relation to the soil, and (2) conductivity of the soil, said applicators being spaced apart from one another, said pulse generator being for generating pulses with a certain length and shape, said pulse generator being provided with a monitor that monitors energy transfer in amplitude, pulse length and frequency, and a sensor for protection of personnel.

8. Device according to claim 7, wherein the applicators are shaped as fixed plates.

9. Device according to claim 7, wherein applicators being shaped as rotating wheels.

10. Device according to claim 7, wherein applicators are adapted to penetrate into the soil to a depth corresponding to sowing depth.

11. Device according to claim 7, wherein the applicators are adapted to transfer electric energy through direct contact with the soil to the depth of the weed seeds.

12. Device according to claim 7, wherein the applicators are adapted to transfer electrical energy to the soil via capacitive or inductive coupling.

13. Device according to claim 7, wherein the pulse generator is adapted to deliver pulses with a duration of 0,01–10 mS.

14. Device according to claim 7, wherein the pulse generator is adapted to deliver pulses in the shape of pulsating rectified voltage.

15. Device according to claim 7, wherein the pulse generator is adapted to deliver pulses in the form of pulsating alternating voltage.

16. Device according to claim 7, wherein the pulse generator is adapted to deliver pulses with sufficiently high amplitude to induce an electric field strength in the soil sufficient enough to destroy the germination of weed seeds in the range of 75–500 kV/m.

17. Device according to claim 7, and further comprising a device for synchronizing the pulses with movement of the applicator so that each region of soil is treated with 5–30 pulses.

18. Device according to claim 7, and further comprising a sensor for measuring conductivity of the treated soil.

19. Device according to claim 7, and further comprising a sensor for measuring movement of the applicator in the treated soil.

20. Device according to claim 7, and further comprising a controller for controlling voltage amplitude and current.

21. Device according to claim 7, and further comprising a controller for controlling voltage amplitude, pulse duration and number of pulses based on sensed conductivity and/or movement.

22. Device according to claim 7, and further comprising cover sheets, for the applicators with built in contact breakers that deactivate supply of voltage to the applicators in the event the cover sheets are touched.

23. Device for selective weed control comprising high voltage applicators that are connected to a pulse generator that receives electrical energy from an energy transformer, wherein the applicators are formed of electrically conductive material and are arranged in pairs spaced from one another, said applicators being arranged to make contact with the soil that is to be treated against germinating weeds, and a device that registers movement of the applicators relative to the soil, and conductivity of the soil, said pulse generator being arranged to generate pulses with a set length and shape, said pulse generator being provided with a monitor that controls energy amplitude, pulse length and frequency, and a sensor for protecting personnel.

24. Device according to claim 23, wherein the applicators are shaped as fixed plates.

25. Device according to claim 23, wherein applicators being shaped as rotating wheels.

26. Device according to claim 23, wherein applicators are adapted to penetrate into the soil to a depth corresponding to sowing depth.

27. Device according to claim 23, wherein the applicators are adapted to transfer electric energy through direct contact with the soil to the depth of the weed seeds.

28. Device according to claim 23, wherein the applicators are adapted to transfer electrical energy to the soil via capacitive or inductive coupling.

29. Device according to claim 23, wherein the pulse generator is adapted to deliver pulses with a duration of 0,01–10 mS.

30. Device according to claim 23, wherein the pulse generator is adapted to deliver pulses in the shape of pulsating rectified voltage.

31. Device according to claim 23, wherein the pulse generator is adapted to deliver pulses in the form of pulsating alternating voltage.

32. Device according to claim 23, wherein the pulse generator is adapted to deliver pulses with sufficiently high amplitude to induce an electric field strength in the soil sufficient enough to destroy the germination of weed seeds in the range of 75–500 kV/m.

33. Device according to claim 23, and further comprising a device for synchronizing the pulses with movement of the applicator so that each region of soil is treated with 5–30 pulses.

34. Device according to claim 23, and further comprising a sensor for measuring conductivity of the treated soil.

35. Device according to claim 23, and further comprising a sensor for measuring movement of the applicator in the treated soil.

36. Device according to claim 23, and further comprising a controller for controlling voltage amplitude and current.

37. Device according to claim 23, and further comprising a controller for controlling voltage amplitude, pulse duration and number of pulses based on sensed conductivity and/or movement.

38. Device according to claim 23, and further comprising cover sheets for the applicators with built in contact breakers that deactivate supply of voltage to the applicators in the event the cover sheets are touched.

* * * * *